INVENTOR
FRANKLIN B. EASTON

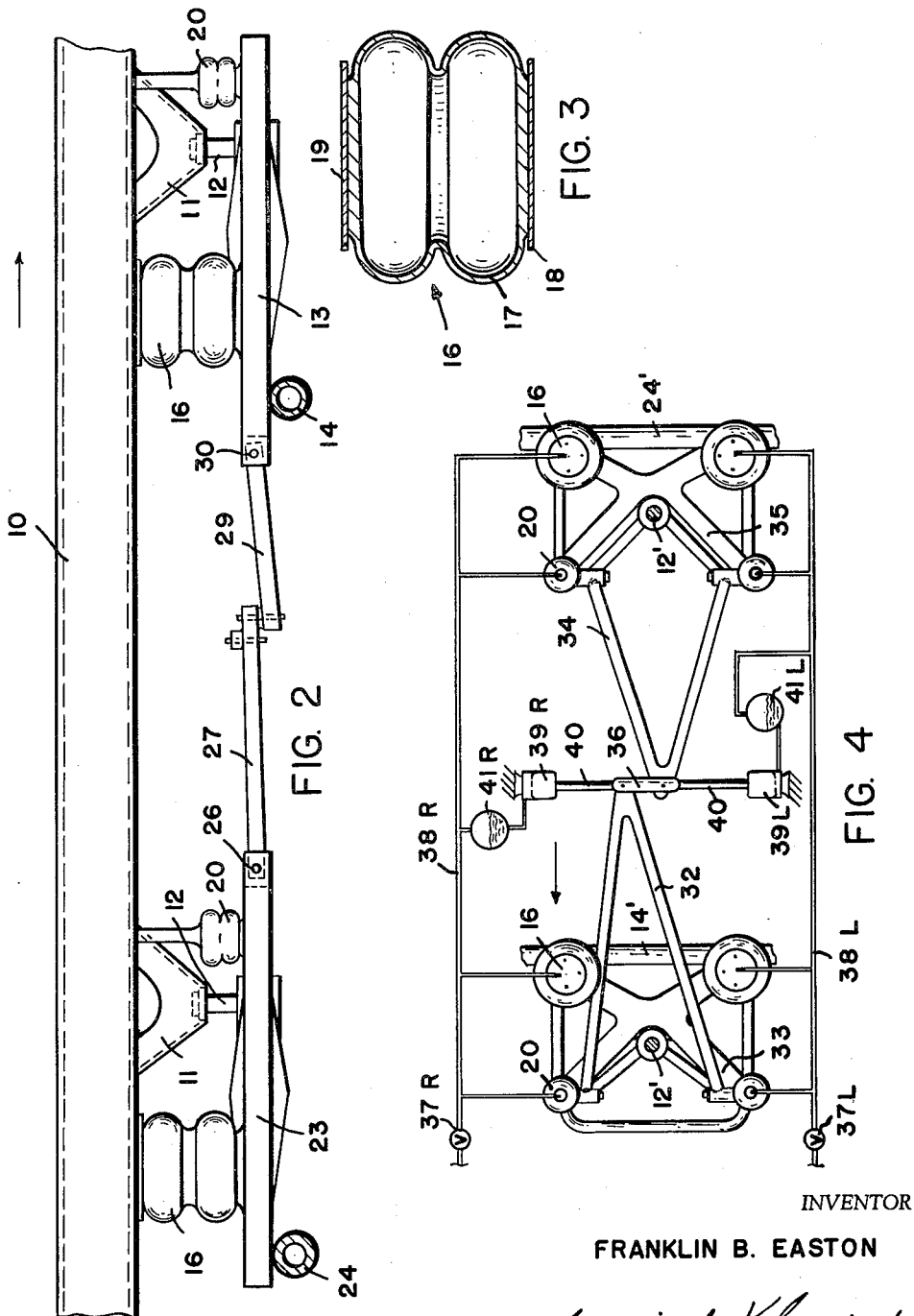
July 31, 1962     F. B. EASTON     3,047,306
ARTICULATED SELF-STEERING TANDEM AIR SUSPENSION
GEAR FOR TRAILERS AND THE LIKE
Filed Oct. 4, 1960     2 Sheets-Sheet 2
INVENTOR
FRANKLIN B. EASTON
BY Francis J. Klempay
ATTORNEY

United States Patent Office 3,047,306
Patented July 31, 1962

3,047,306
ARTICULATED SELF-STEERING TANDEM AIR SUSPENSION GEAR FOR TRAILERS AND THE LIKE
Franklin B. Easton, Sevakeen Country Club, R.D. 2, Salem, Ohio
Filed Oct. 4, 1960, Ser. No. 60,369
9 Claims. (Cl. 280—81)

This invention relates to improvements in undercarriage structures for road trailers and the like, and more particularly to a simplified and more inexpensive arrangement for providing a trailer with a widespread tandem axle assembly. It is recognized that widely separated axles on load-bearing vehicles is advantageous in increasing the load which may be legally carried and in improving the riding qualities of the body or van of the vehicle. However, the use of widely separated trailing axles presents serious problems of articulation and steering to prevent excessive tire wear, absence of weaving, and the elimination of excessive roll-over on tight turns. To overcome these difficulties, prior constructions of wide spread tandem axle assemblies have been rather complicated and costly. The present invention has as its principal object the simplification and cost reduction of a wide spread tandem axle assembly having acceptable characteristics as to tire wear, ride stability, and freedom from excessive lean on turns.

The above object is accomplished by the present invention primarily by utilizing air springs for the load-bearing elements of the undercarriage, which air springs are of the kind having an inherent ability to be laterally offset between their top and bottom load transmitting surfaces while yet retaining the ability to support the vertically imposed load. These are utilized, in a manner to be hereinafter described, in novel combination with self-castering carriers for the vehicle axles whereby the assembly may be self-steering to a marked degree to reduce tire wear to an absolute minimum.

Another object of the invention is the provision in apparatus of the general type outlined above of a simple yet effective method for yieldably retaining the multiple axles in parallel transverse alignment to insure a normal straight-ahead progression of a trailer when being towed along the highway. Another object is to provide a simple yet effective apparatus to automatically compensate for shifting of the vertical load along either side of the trailer in a tight turn, for example, whereby the degree of roll-over of the vehicle body and load is reduced to a marked degree in tight turns to thereby enhance the operational safety of the road vehicle.

Yet another object of the invention is the provision of a wide-spread tandem axle assembly for load-bearing highway trailers which is of vastly increased flexibility as regards its application to various types and styles of bodies. Thus, as will later become apparent, the apparatus of my invention may be applied equally well to a trailer vehicle having a rigid frame and to a vehicle in which no separate frame is provided—the body shell itself serving as a monocoque member to which is directly attached the fifth wheel hitch as well as the undercarriage mounting the road wheels. Such constructions are now being commonly proposed for tanker and bin service in highway hauling.

The above and other objects and advantages of the invention will become apparent upon consideration of the following specification and the accompanying drawing wherein there is shown certain preferred embodiments of the invention.

In the drawing:

FIGURE 2 is a side elevation, with the road wheels removed, of the assembly of FIGURE 1;

FIGURE 3 is a vertical section through an air spring which may be utilized in the assembly of FIGURE 1; and FIGURE 4 is a schematic plan view of a modified form of suspension assembly utilizing the principles of my invention.

Figure 1:
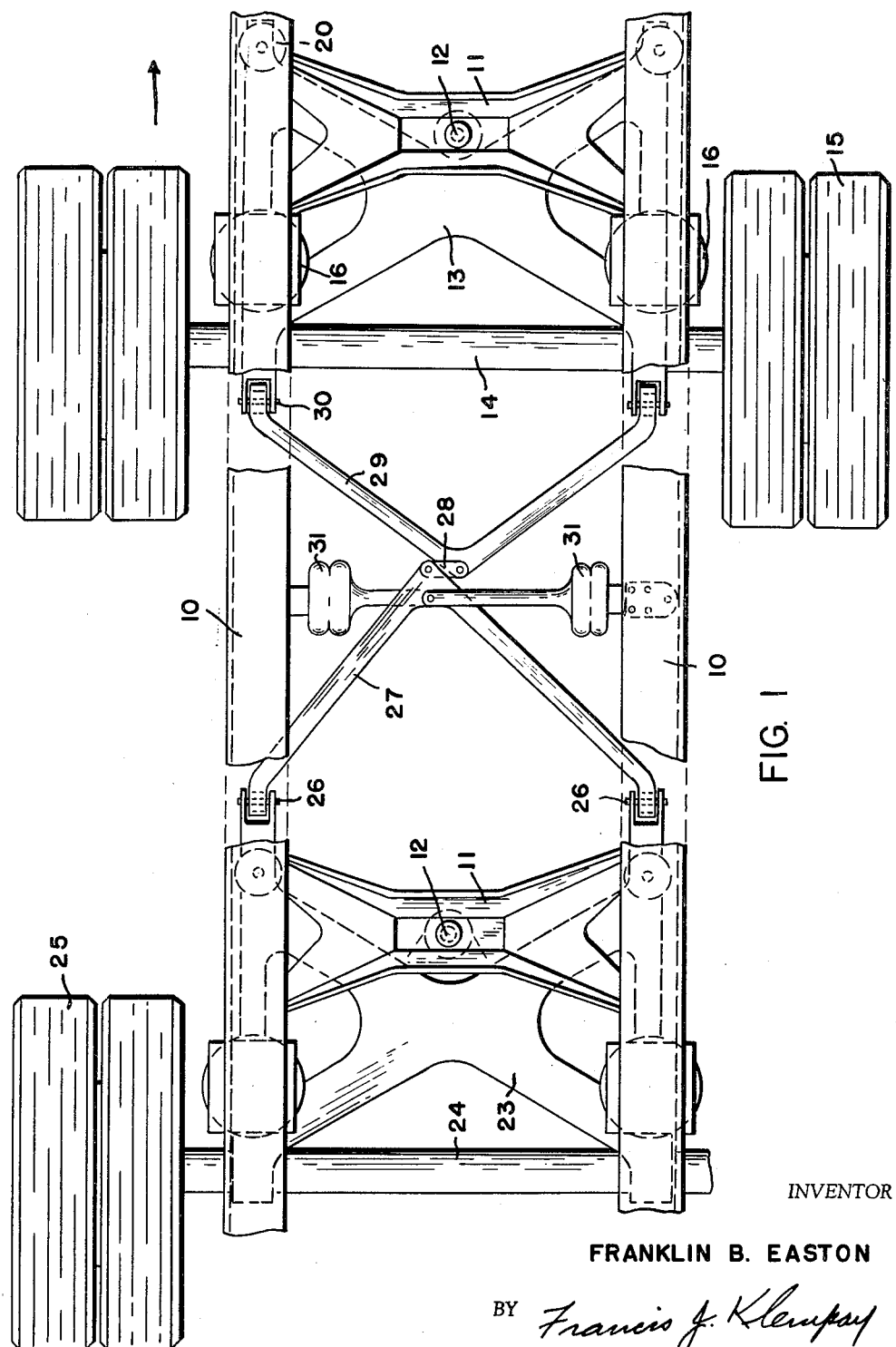
FIGURE 1 is a plan view of an undercarriage constructed in accordance with the principles of my invention.

Referring first to FIGURES 1, 2 and 3 of the drawing, the reference numeral 10 designates the main side rails of a rigid trailer frame which, in practice, supports the load-bearing body of the vehicle. Rigidly connected to the rails 10 in spanning relation therewith and at longitudinally spaced points is a pair of heavy struts 11 which, as shown in FIGURE 2, bulge downwardly in their mid portions. These struts 11 may be formed of heavy steel plate and are welded or otherwise rigidly secured to the side rails 10. Each of the struts 11 carries a heavy depending and centrally disposed pivot pin 12.

Swivelled on the forward pivot pin 12 is a horizontally disposed forward axle carrier 13 to which is rigidly attached a transverse axle 14 disposed well to the rear of the pivot pin. Axle 14 mounts the road-engaging wheels 15 in conventional manner. The carrier 13 has platform-like upper surfaces to which is attached, by means not shown, a first pair of heavy load-bearing air springs 16— one under each side rail 10. These load-bearing air springs 16 are positioned adjacent the axle 14 but are preferably on the pivot pin side of the axle so that the carrier 13 is always biased downwardly at the pivot pin to normally keep the parts tight. The air spring 16 which is shown more or less schematically in FIGURE 3 comprises, in accordance with known practice, a flexible rubberized deeply corrugated tube 17 which is capable of withstanding the high air pressures necessary to support the load imposed on the trailer. Integrally bonded to the lower end of the tube 17 is a plate 18 which is bolted or otherwise rigidly secured to the carrier 13 while a similar plate 19 bonded to the upper end of the tube 17 is bolted or otherwise rigidly secured to the side rail 10 of the trailer frame. The fabric making up the tube 18 is, of course, sufficiently flexible to allow the plate 18 to have considerable horizontal movement with respect to the plate 19 whereby the carrier 13 may have limited swinging movement about the pivot pin 12. A pair of smaller secondary or stabilizing air springs 20 are interposed between the carrier 13 and the side rails 10 of the vehicle frame forwardly of the pivot pin 12 to stabilize the horizontal position of the carrier 13 during road travel.

Pivotally mounted on the rear pin 12 is a second or trailing horizontally disposed axle carrier 23 which carries at its rear end a transversely disposed load-bearing axle 24 mounting road wheels 25 at either of its ends. Carrier 23 is similar to carrier 13 except for certain hitch connections as will be described below and, again, a pair of load-bearing air springs 16 are interposed between upper flat surfaces of the carrier 23 and the undersides of the frame side rails 10 at a point adjacent the load-bearing axle 24. Also, a pair of secondary or stabilizing air springs 20 are interposed between the carrier 23 and the rails 10 forwardly of the rear pivot pin 12.

Pivotally connected at 26 to forward extensions of the carrier 23 is a yoke member 27 connected through link 28 to a yoke member 29 which is pivotally connected at 30 to rearward extensions of the forward axle carrier 13. Now it should be obvious that the interconnection between the carriers 13 and 23 provided by the yokes 27, 29 and the link 28 insures that the carriers will always have substantially equal but opposite pivotal movement about their mounting pivot pins during road travel. This insures that upon imposition of lateral forces to the pivot pins upon turning movement of the trailer the rear road-engaging wheels will always track the front road-engaging wheels and thereby prevent any side thrust or scuffing of the tires. It should be equally obvious that due to the rearward position of the axles 14 and 24 with respect to the front and rear pivot pin 12, respectively, that the undercarriage will be self-steering due to the castering action of the carriers 13 and 23. As explained above, the flexibility of the air springs readily permits this castering action to take place. By referring to FIGURE 1 it can be readily observed that if the vehicle body is subjected to turning movement by a change in direction of its tractor the resultant lateral forces imposed on the pivot pins 12 in opposite directions will tend to rotate the carriers 13 and 23 in opposite directions about vertical axes extending centrally through the axles 14 and 24. As explained above, the interconnection 27–29 insures that the extent of these rotations is substantially equal and opposite and that the rear axle and wheels will accurately track the front axle and wheels.

To lend stability to the forward directional travel and thereby prevent weaving, I preferably impose a yieldable restraint to turning movement of the axle carriers 13 and 23, and this is conveniently done in my assembly by interposing a pair of small and opposed air springs 31 between the yoke 27 and the side rails 10 of the vehicle frame, as shown in FIGURE 1. The size of the springs 31 and the air pressure applied to them is so determined as to give the maximum degree of stiffness without, however, imposing any undue wear on the tires due to side thrust.

It should now be appreciated that in the assembly described above the only points of connection between the vehicle frame and the undercarriage are the pins 12, the pads for receiving the upper surfaces of the air springs 16 and 20, and the anchorages for the springs 31. All of these points of connection may as well be spotted on the shell of a monocoque body structure such as a steel tank or bin, and by reason of the widely spaced pattern of these points of connection and the welding nature of the elements resisting the downward load forces at most of these points such direct application of the undercarriage of my invention to such monocoque body construction is highly advantageous. It is also contemplated, in such applications, that the air springs may be received in downwardly opening recesses or pockets in the body structure to lower the center of gravity of the body and load.

In the modification of the invention shown in FIGURE 4, the load-bearing axles 14′ and 24′ are again in trailing relation to their adjacent pivot pins 12′ but are positioned closer to their adjacent pins so that upon castering movement of their carriers they have a smaller lateral component of movement. This is desirable in the certain types of vehicles where the lateral or side clearances of the road-engaging wheels may be limited. In order, however, to compensate for the greater steering instability which accompanies the closer spacing between the pivot pins and the axles or, rather, to minimize the then greater effect of looseness in the joints between the interconnecting linkage, the interconnecting yokes are made much longer as shown in the FIGURE. Thus, the long yoke 32 is pivotally connected to the forward end of the forward axle carrier 33 and a longer yoke 34 is pivotally connected to the forward end of the rear axle carrier 35. Again, the adjacent ends of the yokes 32 and 34 are interconnected by a link 36 and, if desired, lateral acting air springs may be connected on or adjacent the link 35 to provide the desired steering stiffness as explained above in connection with the first described embodiment. However, the embodiment of FIGURE 4 includes a sway control, now to be described, and it should be understood that this control may be used, with equal effectiveness, in other embodiments of the invention, including that of FIGURES 1 through 3.

Compressed air from a suitable source is manifolded individually to opposite sides of the vehicle—the valve 37R admitting air to the right manifold 38R which is permanently connected to the load-bearing air springs 16 and the stabilizer air springs 20 which are located on the right side of the vehicle. Valve 37R is of the metering type—admitting only enough air to make up for leakage losses which in actual practice is usually very minor. In the embodiment of FIGURE 4 the air springs for controlling steering stiffness are replaced with hydraulic fluid pumps 39R and 39L which may, for example, be of a diaphragm type or a piston and cylinder type. Pumps 39R and L have operating rods 40 connected with the link 36 so that if, for example, the forward axle carrier 33 is rotated counterclockwise about its pivot point 12′ a rod 40 will move inward of the pump 39R to force hydraulic oil outward into a connected transducer 41R. Transducers 41 are merely tanks in the bottom portions of which is contained a quantity of hydraulic oil while the upper spaces above the oil are connected with the respective air manifolds 38. It should be apparent that upon said counterclockwise rotation of the forward axle carrier 33 that an added quantity of hydraulic oil will surge into the transducer 41R to momentarily increase the air pressure in the manifold 38R and thereby increase the air pressure in the air springs which are located along the right side of the vehicle. Now it should be observed that with the vehicle running in the direction indicated by the arrow in FIGURE 4 a turn to the left will pull the forward pivot pin 12′ to the left and thereby cause the said counterclockwise rotation of the forward axle carrier 33. Immediately an increased pressure is applied to the air springs on the right side of the vehicle which is now on the outer side of the turn to resist the tendency of the vehicle and load to roll on the turn. Due to the metering action of valve 37R the increased pressure is maintained for a sufficient length of time to complete the turn after which the pump 39R is retracted back to its normal position, allowing the air pressure to return to normal. Of course, the same operation may be effected by inserting check valves in place of the metering valves in the inlets to the manifolds, if desired.

The above specifically described embodiments of the invention should be considered as illustrative only as many changes may be made therein without departing from the spirit or scope of the invention. Reference should therefore be had to the appended claims in determining the scope of the invention.

I claim:
1. A tandem axle assembly for road trailers and the like comprising a pair of longitudinally spaced pivot members adapted to be rigidly connected to the body or frame of the vehicle in depending relation therewith, an axle carrier pivotally mounted on each of said pivot members, a transversely disposed axle for road-engaging wheels rigidly carried on each of said carriers and positioned rearwardly of the pivot members whereby said carrier and axle assemblies may have castering movement with respect to said body or frame upon turning movement thereof in either direction, a pair of transversely spaced load-bearing air springs interposed between the carrier and said frame or body adjacent the axle in each of said axle and carrier assemblies, a pair of stabilizing air springs interposed between each of said carriers and the frame or body on the longitudinally opposite sides of said pivot members from said axles, said air springs being of the kind which have freedom of relative transverse movement between their top and bottom end portions, and means interconnecting said carriers to effect substantially equal and opposite turning movement of said carriers upon turning movement of the vehicle.

2. An assembly according to claim 1 further including yieldable means tending to hold said carriers in position for straight-ahead movement of the trailer and the like.

3. Apparatus according to claim 1 further characterized in that said means to interconnect said carriers comprises yoke-like members extending toward each other from each of said carriers and being connected to said carriers at laterally spaced points on either lateral side of the pivot members, and a connecting link pivotally connected at one end with one of said yoke-like members and pivotally connected at its other end with the other of said yoke-like members.

4. Apparatus according to claim 3 further including yielding means connected to said yoke-like members adjacent said connecting link to bias said carriers in straight-ahead positions.

5. An articulated self-steering air-suspension gear for supporting the frame or body of a road vehicle comprising a pair of longitudinally spaced but transversely centered pivot members rigidly connected to the frame or body in depending relation therewith, an axle carrier swivelly mounted on each of said pivot members and each bearing a transversely disposed axle rearwardly of the pivot member, the arrangement being such that said carrier and axle assemblies may have castering movement with respect to said frame or body upon turning movement of the vehicle, transversely spaced air springs positioned between said frame or body and each of said carriers and disposed adjacent said axles, said air springs being of the kind which have free relative lateral movement between their top and bottom end portions to allow for limited castering movement of said carrier and axle assemblies, and mechanical linkage interconnecting said carriers to effect substantially equal but opposite castering movement of said carriers upon turning movement of the vehicle.

6. The apparatus according to claim 5 further including yieldable means connected with said linkage to bias said carriers to straight-ahead positions.

7. An articulated self-steering tandem air-suspension gear for road vehicles comprising a pair of longitudinally spaced but transversely centered pivot members extending downwardly from the frame or body of the vehicle, an axle carrier swivelly mounted on each of said pivot members and bearing a transverse axle disposed rearwardly of the pivot member, the arrangement being such that said carrier and axle assemblies may have castering movement with respect to said frame or body upon turning movement of the vehicle, transversely spaced air springs disposed between said carriers and said frame or body adjacent said axles whereby the vehicle load may be transmitted to said carriers, said air springs being of the kind having free relative lateral movement between the top and bottom end portions thereof, means to control the air pressure in the air springs on opposite sides of the vehicle in response to castering movement of said carriers, the arrangement being such that the air pressure is automatically raised in those air springs which are on the outer side of a vehicle turn while the air pressure is reduced in the air springs on the inside of the turn, and said carriers being connected with mechanical linkage to insure equal but opposite castering movement or turning of said carriers.

8. Apparatus according to claim 7 further characterized in that said means to vary the air pressure comprises a double acting air compressor which is actuated in one direction or the other upon turning or castering movement of said carriers.

9. Apparatus according to claim 8 further characterized in that said double acting air compressor comprises a double acting hydraulic fluid pump and a pair of reservoirs partially filled with a hydraulic fluid and respectively interconnected with opposite ends of said pump whereby the air volume above the liquid in one of the reservoirs will be decreased while the air volume in the other of the reservoirs will be increased upon turning movement of said carriers, the upper portions of said reservoirs being connected in the air supply lines for the air springs on opposite sides of the vehicle.

References Cited in the file of this patent

UNITED STATES PATENTS

| | | |
|---|---|---|
| 2,761,693 | Stover | Sept. 4, 1956 |
| 2,794,655 | Charette | June 4, 1957 |
| 2,881,799 | Menewisch | Apr. 14, 1959 |